(12) United States Patent
Devillez

(10) Patent No.: US 12,491,980 B2
(45) Date of Patent: Dec. 9, 2025

(54) AIRCRAFT DOOR ARCHITECTURE COMPRISING AN EMERGENCY ENERGY SOURCE

(71) Applicant: LATECOERE, Toulouse (FR)

(72) Inventor: Sebastien Devillez, Saint Jean (FR)

(73) Assignee: LATECOERE, Toulouse (FR)

( * ) Notice: Subject to any disclaimer, the term of this patent is extended or adjusted under 35 U.S.C. 154(b) by 92 days.

(21) Appl. No.: 18/255,884

(22) PCT Filed: Nov. 26, 2021

(86) PCT No.: PCT/EP2021/083153
§ 371 (c)(1),
(2) Date: Jun. 5, 2023

(87) PCT Pub. No.: WO2022/117453
PCT Pub. Date: Jun. 9, 2022

(65) Prior Publication Data
US 2024/0025530 A1  Jan. 25, 2024

(30) Foreign Application Priority Data
Dec. 5, 2020 (FR) ..................................... 2012739

(51) Int. Cl.
*B64C 1/14* (2006.01)
*B64D 25/14* (2006.01)

(52) U.S. Cl.
CPC ............ *B64C 1/1423* (2013.01); *B64D 25/14* (2013.01)

(58) Field of Classification Search
CPC .............................. B64C 1/1423; B64D 25/14
See application file for complete search history.

(56) References Cited

U.S. PATENT DOCUMENTS

| | | | | |
|---|---|---|---|---|
| 3,454,245 | A * | 7/1969 | Hannagan | B64D 25/14 244/119 |
| 5,251,851 | A * | 10/1993 | Herrmann | B64C 1/143 49/141 |
| 5,738,303 | A * | 4/1998 | Hamatani | B64D 25/14 244/905 |
| 2003/0089827 | A1* | 5/2003 | Baderspach | B64D 25/14 244/137.2 |

(Continued)

FOREIGN PATENT DOCUMENTS

| | | | | |
|---|---|---|---|---|
| CA | 2322568 | A1 * | 4/2001 | .......... B64C 1/1407 |
| EP | 2842873 | | 3/2015 | |

(Continued)

*Primary Examiner* — Michael H Wang
(74) *Attorney, Agent, or Firm* — Defillo & Associates, Inc.; Evelyn A. Defillo

(57) ABSTRACT

An aircraft door architecture having: a door (1); an ejector (3); an inflatable evacuation device (4); an emergency energy source (6) connected to the ejector (3) and to the inflatable evacuation device (4); a control unit (9) having the two following operating states: a nominal operating state in which the inflatable evacuation device (4) is kept in its retracted position and the emergency energy source is deactivated; an emergency operating state in which the emergency energy source (6) activates the actuation device of the ejector (3) in an emergency opening mode of the door (1), and activates the inflation device of the inflatable evacuation device (4) in an emergency inflation mode.

12 Claims, 3 Drawing Sheets

(56) References Cited

U.S. PATENT DOCUMENTS

| | | | | |
|---|---|---|---|---|
| 2013/0075524 A1* | 3/2013 | Islam | ................ | B64D 25/00 244/118.5 |
| 2016/0107733 A1* | 4/2016 | Thomson | ............ | F04D 29/4206 417/53 |
| 2019/0061960 A1* | 2/2019 | McEwen | ................. | B64D 25/14 |
| 2020/0094976 A1* | 3/2020 | John | ..................... | B64D 25/14 |
| 2020/0148370 A1* | 5/2020 | Bergonnier | ............ | B64D 25/14 |
| 2022/0388679 A1* | 12/2022 | Palaniappan | .......... | B64D 25/14 |
| 2023/0166852 A1* | 6/2023 | Mugeraya | .............. | B64D 25/14 244/138 R |

FOREIGN PATENT DOCUMENTS

| | | |
|---|---|---|
| FR | 2975967 | 12/2012 |
| WO | WO2016061446 | 4/2016 |

\* cited by examiner

AIRCRAFT DOOR ARCHITECTURE COMPRISING AN EMERGENCY ENERGY SOURCE

CROSS REFERENCE TO RELATED APPLICATION

This application is a national stage entry of PCT/EP2021/083153 filed Nov. 26, 2021, under the International Convention and claiming priority over French Patent Application No. FR2012739 filed Dec. 5, 2020.

TECHNICAL FIELD

The invention concerns the field of aeronautics and more particularly concerns the safety units in an aircraft door architecture.

PRIOR ART

Numerous aircraft are equipped with doors mounted in an opening in the fuselage to give access to the interior of the aircraft. The doors are adapted to occupy: a closed position that enables safe flight of the aircraft and pressurisation of the interior of the aircraft; and an open position that enables access to the cabin or to the hold.

These aircraft doors are generally part of an architecture that comprises, in addition to the door, maneuvering mechanisms as well as safety equipment.

Aircraft door architectures having to serve as emergency exits generally comprise: at least one ejector adapted to drive emergency opening of the door; and an inflatable actuation device such as a slide enabling evacuation of the aircraft in the event of an accident once deployed.

Inflatable evacuation devices are generally associated with emergency inflation means that must enable very rapid inflation of the device for emergency evacuation of the aircraft. The commonest inflation means consist of a cylinder of pressurized inert gas, such as nitrogen.

The actuation means of the ejectors also generally consist of a cylinder of pressurized gas enabling activation of the ejector in an emergency door opening mode that enables very rapid opening of the door requiring minimal effort by the user.

Other means for inflating the inflatable evacuation device are known. For example the patent application WO2016/061446 describes an inflatable evacuation device that is inflated by a compressor powered by a battery.

Other means for actuating an ejector are also known. For example, the patent application FR2975967 describes an ejector with mechanical actuation means. Also, some airliners are equipped with electric actuators on their doors.

SUMMARY OF THE INVENTION

The invention has for object improving the arrangement of the safety elements of the prior art aircraft door architectures.

To this end, the invention is directed to an aircraft door architecture including:
a door adapted to be mounted in an opening in the fuselage of an aircraft and adapted to occupy an open position and a closed position;
an ejector adapted to drive emergency opening of the door;
an inflatable evacuation device adapted to occupy a retracted storage position and a deployed evacuation position;
an emergency energy source connected to the ejector and to the inflatable evacuation device, this emergency energy source being adapted to activate means for actuating the ejector and means for inflating the inflatable evacuation device;
a control unit having the following two operating states: a nominal operating state in which the inflatable evacuation device is retained in its retracted position and the emergency energy source is deactivated; and an emergency operating state in which the emergency energy source activates the means for actuating the ejector in an emergency mode of opening the door and activates the means for inflating the inflatable evacuation device in an emergency inflation mode.

Here an aircraft door architecture is defined as a combination formed by an aircraft door and by various items of comfort and safety equipment that are associated with that door, whether they are mounted directly on the door or in the environment of the door. An aircraft door architecture comprises at least an aircraft door, an ejector and an inflatable evacuation device. This architecture therefore includes various elements intended to interact. For example, the ejector and the inflatable evacuation device can be mounted on the door. The various elements of the door architecture are interconnected in a physical and functional manner.

This kind of aircraft door architecture benefits from the use of a single emergency energy source powering both the ejector and the inflatable evacuation device. This emergency energy source may optionally further power other safety or comfort elements of the aircraft door, such as a retaining bar actuator.

The invention in particular enables the use of a single energy source for all the emergency systems of the door so that the weight, acquisition cost and maintenance cost are reduced. This emergency source is segregated from the rest of the aircraft onboard energy management system so that no untimely opening of the door is to be feared.

In accordance with one embodiment:
the emergency energy source is an electric secondary cell,
the ejector includes electric actuation means,
the inflatable evacuation device includes electric inflation means.

In this case the aircraft door architecture can dispense completely with energy stored in the form of a compressed gas. Indeed, in the prior art the storage of a compressed gas such as nitrogen, generally at around 3000 psi, in different cylinders for the ejector and for the inflatable actuation device represents a high onboard weight and necessitates costly periodic maintenance. Frequent inspection is indeed required to guarantee the safety of the pressure equipment as well as structural inspection to verify the integrity of the cylinders. Cylinders of compressed gas filled and sealed in the factory have moreover been developed to improve the availability of these energy sources at the price of more costly spares and increased complexity of logistics.

The modes of electric energy use enabled in the door architecture according to the invention make it possible to avoid all the disadvantages linked to the use of cylinders of gas under pressure or of purely mechanical systems.

The electrical energy from the emergency energy source can moreover power other actuators useful or necessary for the functioning of the aircraft door, such as the devices for arming and disarming the inflatable evacuation device. Electric actuators advantageously replace mechanical activation hereto necessitating a succession of elements such as links and transmission devices, rendering the door heavy and costly when it has to transport mechanical energy over a great distance or a complex path.

The components powered by the emergency energy source, when it is electric, can moreover be more easily regulated: an ejector provided with electric actuation means can be more easily regulated in terms of opening speed during its travel in emergency opening mode by electronic control means. An inflatable evacuation device provided with electric inflation means can also benefit from electronic control of its inflation.

In accordance with one embodiment the ejector includes connectors for electrical connection to an onboard electrical network of an aircraft, the electric actuation means of the ejector being also adapted to be activated by an aircraft onboard electrical network.

In accordance with this embodiment the activation means of the ejector as well as any other electric actuator adapted to be powered by the emergency energy source can moreover be used in the nominal operating state. These actuators are then powered by the aircraft onboard electrical network. These actuators then serve two functions: a function in the nominal operating state that aims to assist users during normal functioning of the door, for example by automating the opening or the closing of the door, or replacing activation of mechanical levers by electronic control; and a safety function in the emergency operating state, in particular emergency opening of the door powered by the emergency energy source.

The aircraft door architecture according to the invention may have the following features, separately or in combination:

- it further includes a retaining bar actuator that is activatable between: an arming position in which the inflatable evacuation device is retained: and a disarming position in which the inflatable evacuation device is released; the emergency energy source being also connected to the retaining bar actuator, the emergency energy source being adapted to activate the retaining bar actuator;
- the control unit includes a control interface for a user, this control interface being adapted to drive the retaining bar actuator to its arming position or its disarming position when the control unit is in its nominal operating state;
- the control unit further includes an opening from the exterior operating state in which the control unit drives the retaining bar actuator to its disarming position in the event of opening of the door from the exterior;
- in the opening from the exterior operating mode the control unit activates the means for actuating the ejector in a nominal mode of opening the door;
- in its nominal operating state the control unit is adapted to control the ejector in accordance with a mode for assisting opening/closing of the door;
- the control interface for a user is adapted also to control the ejector in the mode for assisting opening/closing of the door;
- the emergency energy source is activated by a mechanical trigger connected to a mechanism for opening/closing the door;
- the door comprises an arming/disarming handle and in that the mechanism for opening/closing the door comprises an opening handle that is mechanically connected to the mechanical trigger by means of a coupling means actuated by the arming/disarming handle;
- the emergency energy source includes a thermal battery;
- the emergency energy source includes a first thermal battery adapted to power electrically the retaining bar actuator and to activate a second thermal battery of greater capacity than the first thermal battery, the second thermal battery being adapted to power electrically the ejector and the means for inflating the inflatable evacuation device;
- the door architecture includes an isolation box having a mode enabling electrical connection of the ejector and a mode for breaking that electrical connection;
- the isolation box is activated in breaking mode upon activation of the emergency energy source;
- the retaining bar actuator includes connectors for electrical connection to an onboard electrical network of an aircraft, the retaining bar actuator being also adapted to be activated by an aircraft onboard electrical network.

The opening handle that is referred to here as forming part of the opening/closing mechanism of the door and that is mechanically connected to the mechanical trigger by a coupling means may be an interior opening handle or an exterior opening handle, aircraft generally including these two types of opening handle.

BRIEF DESCRIPTION OF THE FIGURES

Other features and advantages of the invention will emerge from the following non-limiting description with reference to the appended drawings in which.

DETAILED DESCRIPTION OF THE INVENTION

Figure 1:
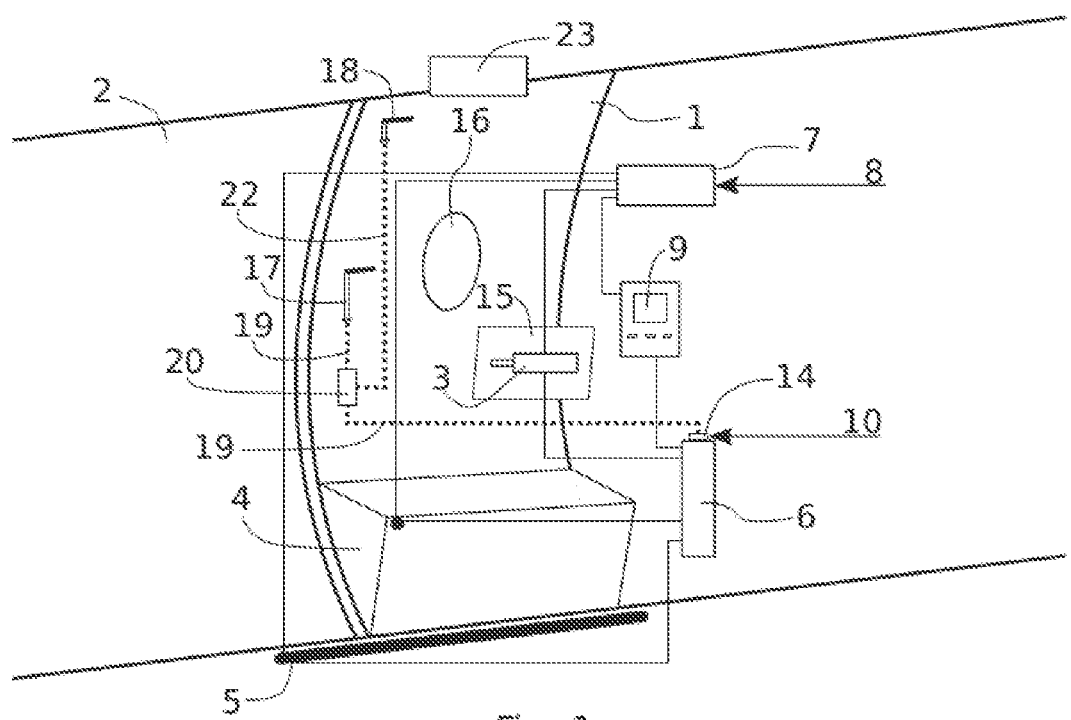
FIG. 1 represents schematically an aircraft door architecture according to the invention.

FIG. 1 represents schematically an aircraft portion in which is installed an aircraft door architecture according to the invention.

This architecture comprises:

- a door 1 mounted in an opening in the fuselage 2 of the aircraft;
- an ejector 3 adapted to drive emergency opening of the door 1;
- an inflatable evacuation device 4 that here includes an inflatable slide mounted on the door 1 in a retracted storage position;
- a retaining bar associated with an actuator 5 enabling attachment of the inflatable evacuation device 4 to the aircraft.

The door 1 is articulated by an arm 15 so as to be able to occupy an open position and a closed position. A safety porthole 16 enables the external conditions to be seen before opening the door 1.

This aircraft architecture includes an emergency electric network consisting of an emergency energy source 6 that is connected to the ejector 3, to the inflatable evacuation device 4 and to the retaining bar actuator 5. The emergency energy source 6 may optionally be connected to any other safety equipment that has to be activated during an emergency maneuver.

The door 1 further comprises an interior opening handle 17 driving a classic mechanism (not represented) for opening/closing the door, this mechanism enabling locking and unlocking of the door in its frame. This opening/closing mechanism is also controlled by an exterior handle (not visible in FIG. 1) that is accessible from the exterior of the aircraft.

The door 1 further comprises an arming/disarming handle 18 adapted to occupy two positions: an arming position corresponding to the deployment of the inflatable evacuation device 4 once the door 1 has been locked; and a disarming position corresponding to deactivation of the inflatable evacuation device 4. The inflatable evacuation device 4 may be armed or disarmed mechanically or electrically.

In addition to their classic function, the interior opening handle 17, the exterior opening handle and the arming/disarming handle 18 serve a function relating to the invention and in this regard are associated with mechanical connection means 19, 22. The interior opening handle 17 and the exterior opening handle are mechanically connected to a mechanical trigger 14 of the emergency energy supply 6 by a coupling means 20 that is actuated by a mechanical connection means 22 relative to the arming/disarming handle 18.

The aircraft door architecture further comprises connectors electrically connected to the onboard electric network of the aircraft. The door architecture therefore comprises an isolation box 7 to which the onboard electric network of the aircraft is connected, for example a 28 V DC network (schematically represented by the arrow 8). The isolation box 7 distributes electrical energy from the onboard network to the ejector 3 as well as to the retaining bar actuator 5. The isolation box 7 moreover functions in two modes:
  a mode enabling electrical connection of the ejector 3 and of the retaining bar actuator 5 to the onboard network;
  a mode of breaking that electrical connection.

The aircraft door architecture further comprises a control unit 9 connected to the emergency energy source 6 as well as to the isolation box 7. The control unit 9 has the following two operating states:
  a nominal operating state in which the inflatable evacuation device 4 is retained in its retracted position and the emergency energy source is deactivated, and
  an emergency operating state in which the emergency energy source 6 activates the actuation means of the ejector 3 in a mode for emergency opening of the door 1 and activates the inflation means of the inflatable evacuation device 4 in an emergency inflation mode.

The nominal operating state corresponds to normal use of the door 1, which can therefore be closed and locked, as well as unlocked and opened, without activating the inflatable evacuation device 4. The emergency operating state corresponds to a situation in which the door 1 is opened during an emergency maneuver by means of the interior handle 17.

The control unit 9 is moreover connected to a set of sensors supplying information as to the state of the door at any time, that is to say on the physical position of the door 1 as well as on the position of all its control elements. This set of sensors is schematically represented in FIG. 1 by a box 23.

The emergency energy source 6 may consist of any energy source adapted to actuate the ejector as well as to inflate the inflatable evacuation device 4. It may for example be a single cylinder of gas under pressure or preferably a source of electrical energy. In accordance with a preferred feature the emergency energy source 6 consists of a thermal battery obtained by stacking cells each of which includes a layer forming the anode, a solid electrolyte layer, a layer forming the cathode and a heat source layer.

Here the thermal battery has the advantage that it can be stored for a very long time without deterioration of its energy potential. Moreover, the thermal battery is adapted to supply a large quantity of energy (here reflected in a high current) in very little time for triggering the safety elements, in particular the ejector and the inflatable evacuation device. The thermal battery requires for its activation a small quantity of energy that can be supplied by the mechanical work of a maneuver actuated by a user. In this regard the thermal battery is activated by a mechanical trigger 14 connected to a door opening mechanism. To be more precise, when the arming/disarming handle is in the armed position, the movement of an opening handle may be exploited to activate the thermal battery. Activation of the thermal battery here constituting the emergency energy source 6 is schematically represented by the arrow 10 in FIG. 1. This activation is therefore effected by the mechanical trigger 14 which is itself driven by the mechanical connection means 19 connected to the handle 17 (as well as to the exterior opening handle that cannot be seen in the figure). The coupling means 20 is a mechanical device (latch or other device) that is driven by the arming/disarming handle 18 and enables:
  mechanical coupling of the (interior and exterior) opening handles to the mechanical trigger 14 of the emergency energy source 6 so that actuation of this handle 17 activates the emergency energy source 6 when the arming/disarming handle 18 is in its arming position; and
  decoupling the opening handle 17 from the mechanical trigger 14 when the arming/disarming handle 18 is in its disarming position so that this handle 17 controls only the opening mechanism of the door, in the classic manner, without acting on the mechanical trigger 14.

The coupling means 20 is driven by the arming/disarming handle 18 by means of the mechanical connection means 22. The mechanical connection means 22 may for example be a link or any other mechanical transmission device.

The ejector 3 in this example includes electric actuation means. In the FIG. 1 schematic the ejector 3 is for example an electric cylinder or a linear motor. It may equally be an electric motor, possibly with a reducer, driving directly in rotation a shaft of the door mechanism driving opening of the door 1. The ejector 3 additionally carries its control electronics enabling: in a nominal operating state, assisting or motorizing opening and closing of the door 1 using energy from the onboard electric network 8; and an emergency mode for opening the door 1 very rapidly thanks to energy from the emergency energy source 6.

Here the inflatable evacuation device 4 includes an inflatable slide that is classic in the aeronautical field as well as means for inflating this slide. In the present example the inflation means include a 4000 W electric motor directly driving a radial pump at 14 000 revolutions/min enabling rapid inflation of the slide when this motor is powered by the emergency energy source 6.

Here the retaining bar actuator 5 includes an electric actuator (cylinder or rotary motor) enabling arming or disarming of the inflatable evacuation device 4, that is to say locking retaining hooks onto the retaining bar or to the contrary releasing them. When the actuator 5 disarms the device 4 the control unit 9 is in a nominal operating state. The door 1 can be opened or closed, carrying as it moves the inflatable evacuation device 4 without triggering it. When the actuator 5 arms the inflatable evacuation device 4 the retaining bar is retained against the floor of the aircraft and the inflatable evacuation device 4 is ready to be triggered. In the event of a maneuver opening the door in this configuration the thermal battery constituting the emergency energy source 6 is activated and the control unit 9 then goes to an emergency operating state. The control unit then in particular brings about inflation of the inflatable evacuation device 4, which remains attached to the floor of the aircraft.

Here the retaining bar actuator 5 is electrically driven according to the position of the arming/disarming handle 18. Alternatively, the actuator 5 is driven directly by the physical movement of the arming/disarming handle 18.

The isolation box 7 includes circuit-breaker elements consisting for example of relays or power transistors and enabling cutting of the electrical connection between the onboard electric network 8 and the elements that are powered by that network in the nominal operating state (the ejector 3 and the retaining bar actuator 5 in this example). The control unit 9 is adapted to control the isolation box 7 to connect or to disconnect the supply of energy from the onboard electric network 8.

The control unit 9 is moreover connected to the emergency energy source 6. The control unit 9 is therefore able to tell the (activated or not activated) state of the emergency energy source 6 and can moreover obtain its own supply of electrical energy from either the onboard network 8 (resulting from its connection to the isolation box 7) or the emergency energy source 6.

Figure 2:
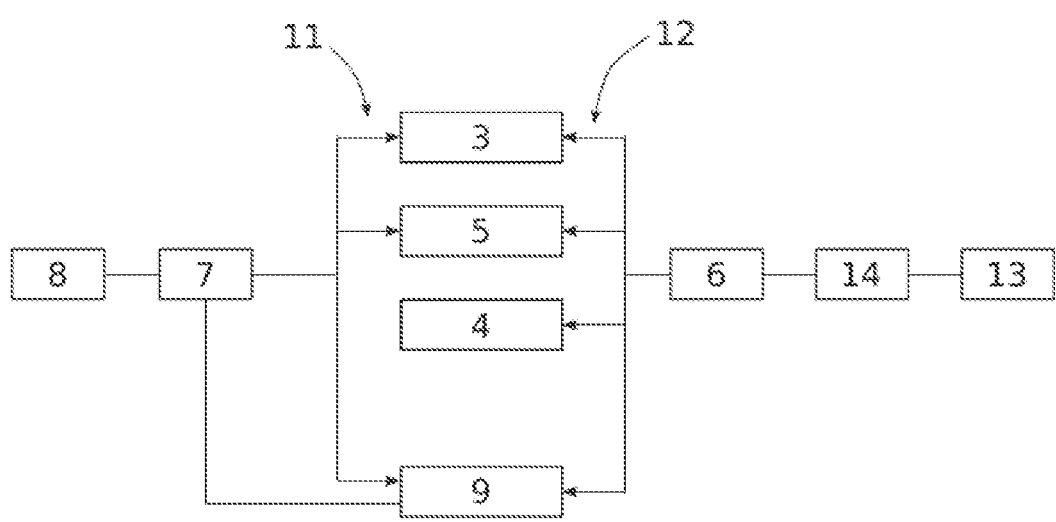
FIG. 2 is a diagram illustrating the operation of the aircraft door architecture.

FIG. 2 is a diagram illustrating how the aircraft door architecture that has been described functions.

The ejector 3, the inflatable evacuation device 4 and the retaining bar actuator 5 are represented in the form of rectangles at the centre of the figure. To the left of these rectangles FIG. 2 depicts the onboard electrical network of the aircraft, here with the isolation box 7 connected to the electrical network 8 of the aircraft. The powering of the ejector 3 and of the actuator 5 by the onboard electrical network via the isolation box 7 is schematically represented by the arrows 11.

FIG. 2 moreover depicts, on the right in the diagram, the elements enabling powering of the actuators by the emergency energy source 6. This is schematically represented by the arrows 12.

This schematic view in FIG. 2 moreover depicts the control unit 9 that is also connected to the onboard electrical network 8 and to the emergency energy source 6.

When the aircraft door is in its normal operating mode the control unit 9 is electrically powered by the onboard electrical network 8 and is in its nominal operating state. The door can be opened to enable access to the cabin of the aircraft and can be closed to enable flight of the aircraft. In this nominal operating state the emergency energy source 6 is deactivated, the inflatable evacuation device 4 is retained in its retracted storage position, remaining fixed to the door 1, and the isolation box 7 enables powering of the ejector 3 and of the retaining bar actuator 5 by the onboard electrical network 8. No element is electrically powered by the emergency energy source 6 in the nominal operating state.

In this nominal operating state the ejector 3 can be controlled in a mode for assisting opening/closing of the door. The actuation means of the ejector 3 are then driven in movement at low speed corresponding to normal opening or closing of the door. This can be because of control by a user and the control unit 9 can then be provided with a control interface (screen, keys, etc.) enabling the user to actuate powered opening or closing of the door. Alternatively, the door may include sensors detecting manual opening/closing of the door by a user acting on the opening handle 17 and the ejector 3 may be controlled in response to such detection, accompanying the gesture of the user with the ejector in assistance mode.

In this nominal operating state the retaining bar actuator 5 is controlled by the control unit 9:
- to disarm the inflatable evacuation device 4 at the command of a user acting on the arming/disarming handle 18 so that the door can be opened/closed normally;
- to arm the inflatable evacuation device 4 at the command of a user acting on the arming/disarming handle 18, or automatically, pending the flight of the aircraft;
- to disarm the inflatable evacuation device 4 when the latter is armed and the door 1 is opened from the exterior of the aircraft.

When the inflatable evacuation device 4 is armed and a user actuates opening of the door 1 from the interior of the aircraft by actuating the handle 17 the mechanical trigger 14 associated with the door opening mechanism 13 activates the emergency energy source 6. To be more precise, the mechanical connection means 19 enables direct activation of the mechanical trigger 14 by the physical movement of the handle 17 without necessitating any exterior energy source. This emergency situation arises for example if the door is opened in an emergency following an accident, even if all the onboard electrical means are inoperative.

Here the mechanical trigger 14 drives activation of a heating element that triggers the activation of the thermal battery here constituting the emergency energy source 6. The mechanical trigger 14 may be associated with any appropriate heating element such as friction devices, electric devices or powder devices.

The control unit 9, which is connected to the emergency energy source 6, therefore receives information relating to the activation of the emergency energy source 6. The control unit 9 then goes to an emergency operating state and causes the isolation box 7 to break the circuit so that the onboard electrical network 8 no longer powers any element 3, 5, 9.

In this emergency operating state the control module 9 is now powered by the emergency energy source 6 and executes the following commands:
- the ejector 3 is commanded in emergency opening mode to bring about very rapid opening of the door;
- the means for inflating the inflatable evacuation device 4 are then commanded in emergency inflation mode to bring about very rapid inflation (in a few seconds) of the inflatable evacuation device.

The ejector 3 and likewise the inflatable evacuation device 4 may be controlled in a more sophisticated manner in these emergency modes by the control electronics. For example, the ejector 3 may slow down the opening of the door 1 when the inflatable evacuation device 4 is detached from the door and then accelerate opening again. Different inflation speeds for the inflatable evacuation device 4 may equally be used during this inflation operation.

When the inflatable evacuation device 4 is armed (arming/disarming handle 18 in the armed position) and a user actuates opening from outside the aircraft by actuating the exterior handle of the door 1 the opening mechanism 13 also activates the mechanical trigger 14 and therefore the emergency energy source 6 by means of the mechanical connection 19. This emergency situation arises for example if the door is opened following an accident, but from the outside (for example by rescuers). However, in this situation of opening from the outside the control unit 9 goes to another operating state referred to here as the "opening from the outside operating state". In this opening from the outside operating state the control unit 9 causes the isolation box 7 to break the circuit so that the onboard electrical network 8 no longer supplies any element 3, 5, 9. The control module 9 is now powered by the emergency energy source 6 and executes the following commands:

disarm the inflatable evacuation device 4;
cause the ejector 3 to perform opening in a nominal opening mode, that is to say in the same manner as during nominal functioning (opening the door at normal speed, not emergency opening).

Figure 3:
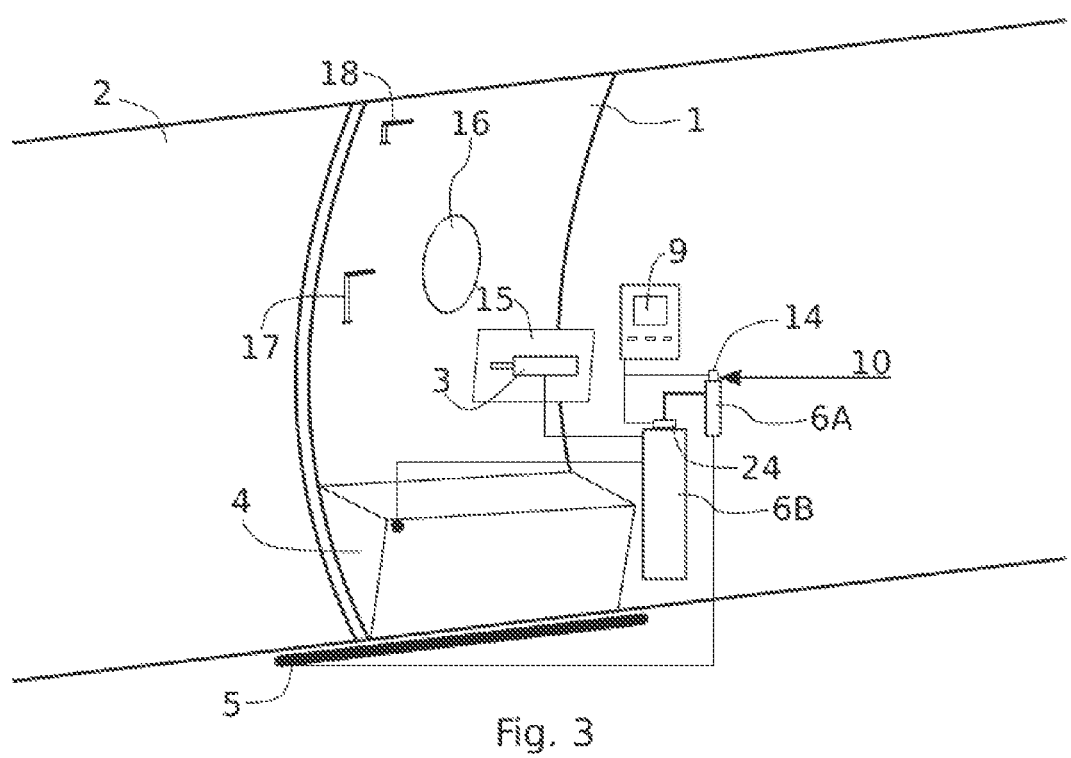
FIG. 3 is a view similar to FIG. 1 for a second embodiment of the invention.

FIG. 3 depicts a second embodiment relating to a variant emergency energy source. Elements common to the first embodiment from FIG. 1 bear the same reference numbers in the figures.

In accordance with this second embodiment the emergency energy source consists of two thermal batteries 6A, 6B, the first thermal battery 6A being of reduced capacity and volume compared to the second thermal battery 6B.

In FIG. 3 only the details relating to this thermal battery structure have been represented but this variant nevertheless contains the same elements as the FIG. 1 embodiment. Thus the first thermal battery 6A includes a mechanical trigger 14 that can be activated (as depicted by the arrow 10) by mechanical connections connected to the interior opening handle 17 and the exterior opening handle.

The first thermal battery 6A is electrically connected to supply electrical energy only to the retaining bar actuator 5 and to a trigger 24 of the second thermal battery 6B. The first thermal battery 6A is therefore rated only to power the retaining bar actuator 5 and the trigger 24 of the second thermal battery 6B, which have low consumption of electrical energy.

The second thermal battery 6B is connected to serve as an electrical power supply to the ejector 3 and to the inflation means of the inflatable evacuation device 4, which are large consumers of electrical energy, and the second thermal battery 6B, as well as the associated power supply cables, are rated accordingly.

The control unit 9 is connected to the two thermal batteries so as to be aware of their respective state.

In accordance with this configuration the nominal operating state of the control unit 9 is the same as in the first embodiment. In the emergency operating state the (interior or exterior) opening handle will trigger the trigger 14 of the first thermal battery 6A mechanically and the latter, being of reduced size, will be activated very rapidly. The electrical power supply of the retaining bar actuator 5 is then available very rapidly and the first thermal battery 6A activates in parallel the larger second thermal battery 6B, which requires a longer activation time.

In the emergency operating state triggered from the exterior, if a user actuates the exterior opening handle when the door is armed, this architecture guarantees that the retaining bar actuator 5 is electrically powered very rapidly by the first thermal battery 6A so that the control unit 9 is able to disarm the inflatable safety device 4 rapidly. The first thermal battery 6A can then be placed at a distance from the actuator 5 by power supply cables of small cross-section, given the low electrical consumption of this actuator 5. The location of the first thermal battery 6A can therefore be optimized so as to be as close as possible to the mechanical triggering elements (the mechanical connection 19 to the opening handles) with few constraints regarding its electrical wiring.

For its part the second thermal battery 6B is placed as close as possible to its electrical consumers to limit losses and the length of the cables of large cross-section needed, with no constraints relating to its triggering, the latter being obtained by means of a simple electrical cable of small cross-section from the first thermal battery 6A. The second thermal battery 6B is triggered with a delay relative to the first thermal battery 6B whilst nevertheless allowing timely powering of the elements 3, 4 concerned.

Alternatively, as many thermal batteries as necessary may be used and triggered in cascade in this first design where a first thermal battery of low capacity is triggered first to render rapidly available the powering of an element that needs to be powered as a priority.

Variants of the aircraft door architecture may be employed. For example, the control electronics of the control unit 9 may be physically grouped with the power elements of the isolation box 7 in the same casing, which may also optionally contain the control electronics of the various actuators.

Arming and disarming of the door in the nominal operating mode can also be commanded by the control unit 9 in addition to or instead of a mechanical arming/disarming handle. The user is then able to arm and disarm the door directly at the user interface of the control unit 9, which actuates the retaining bar actuator 5 electrically. In this case the coupling means 20 is an electromechanical component activated by the control unit when the user arms the door.

The electrical architecture may be modified whilst retaining the same functionalities, for example electrically powering the actuators either by the onboard network or by the emergency energy source may be directly controlled by the control unit 9.

The emergency energy source may moreover consist of energy sources other than electrical energy sources. For example, the emergency energy source may be a source of pneumatic energy. This energy is then distributed by pneumatic distributors and regulators feeding pneumatic actuators.

The invention claimed is:

1. An aircraft door architecture comprising:
    a door (1) adapted to be mounted in an opening in a fuselage of an aircraft and adapted to occupy an open position and a closed position;
    an ejector (3) adapted to drive emergency opening of the door (1);
    an inflatable evacuation device (4) adapted to occupy a retracted storage position and a deployed evacuation position;
    a retaining bar actuator (5) that can be activated between:
        an arming position in which the inflatable evacuation device (4) is retained; and a disarming position in which the inflatable evacuation device (4) is released;
    an emergency energy source (6) connected to the ejector (3), to the inflatable evacuation device (4), and to the retaining bar actuator (5), the emergency energy source (6) being adapted to activate an actuating device for actuating the ejector (3), an inflating device for inflating the inflatable evacuation device (4), and the retaining bar actuator (5);
    a control unit (9) having the following two operating states: a nominal operating state in which the inflatable evacuation device (4) is retained in the retracted position and the emergency energy source is deactivated; and an emergency operating state in which the emergency energy source (6) activates the actuating device in an emergency mode of opening the door (1) and activates the inflating device in an emergency inflation mode;
    wherein the emergency energy source (6) is an electric secondary cell;

the ejector (3) includes an electric actuation device; the inflatable evacuation device (4) includes an electric inflation device;

wherein the emergency energy source (6) includes a thermal battery; and wherein the emergency energy source includes a first thermal battery (6A) adapted to power electrically the retaining bar actuator (5) and to activate a second thermal battery (6B) of greater capacity than the first thermal battery (6A), the second thermal battery (6B) being adapted to power electrically the ejector (3) and the inflating device.

2. The aircraft door architecture as claimed in claim 1, wherein the control unit (9) includes a control interface for a user, the control interface being adapted to drive the retaining bar actuator (5) to the arming position or the disarming position when the control unit (9) is in the nominal operating state.

3. The aircraft door architecture as claimed in claim 1, wherein the control unit (9) further includes an opening from the exterior operating state in which the control unit (9) drives the retaining bar actuator (5) to the disarming position in the event of opening of the door (1) from the exterior.

4. The aircraft door architecture as claimed in claim 3, wherein in the opening from the exterior operating mode the control unit (9) activates the actuating device in a nominal mode of opening the door (1).

5. The aircraft door architecture as claimed in claim 1, wherein in the nominal operating state the control unit (9) is adapted to control the ejector (3) in accordance with a mode for assisting opening/closing of the door (1).

6. The aircraft door architecture as claimed in claim 5, wherein the control interface for a user is adapted also to control the ejector (3) in the mode for assisting opening/closing of the door (1).

7. The aircraft door architecture as claimed in claim 1, wherein the emergency energy source (6) is activated by a mechanical trigger (14) connected to a mechanism for opening/closing the door (1).

8. The aircraft door architecture as claimed in claim 7, wherein the door (1) comprises an arming/disarming handle (18) and in that the mechanism for opening/closing the door comprises an opening handle that is mechanically connected to the mechanical trigger (14) by a coupling device (20) actuated by the arming/disarming handle (18).

9. The aircraft door architecture as claimed in claim 1, wherein the ejector (3) includes connectors for electrical connection to an onboard electrical network of an aircraft, the electric actuation device also being adapted to be activated by an aircraft onboard electrical network.

10. The aircraft door architecture as claimed in claim 9, further including an isolation box (7) having a mode enabling electrical connection of the ejector (3) and a mode for breaking that electrical connection.

11. The aircraft door architecture as claimed in claim 10, wherein the isolation box (7) is activated in breaking mode upon activation of the emergency energy source (6).

12. The aircraft door architecture as claimed in claim 9, wherein the retaining bar actuator (5) includes connectors for electrical connection to an onboard electrical network of an aircraft, the retaining bar actuator (5) also being adapted to be activated by an aircraft onboard electrical network.

* * * * *